| United States Patent [19] | [11] Patent Number: 4,782,103 |
|---|---|
| Ogoe | [45] Date of Patent: Nov. 1, 1988 |

[54] ULTRA VIOLET LIGHT RESISTANT CARBONATE POLYMERS WITH IMPROVED PROCESSING STABILITY

[75] Inventor: Samuel A. Ogoe, Angleton, Tex.

[73] Assignee: The Dow Chemical Company, Midland, Mich.

[21] Appl. No.: 86,994

[22] Filed: Aug. 19, 1987

[51] Int. Cl.$^4$ .................... C08K 5/47; C08K 5/44
[52] U.S. Cl. ........................ 524/83; 524/91; 524/168; 524/169; 524/336; 524/339
[58] Field of Search ............... 524/91, 336, 337, 169, 524/83, 168

[56] References Cited

U.S. PATENT DOCUMENTS

| 3,367,958 | 2/1968 | Kirkendall | 524/91 |
|---|---|---|---|
| 4,218,357 | 8/1980 | Mark et al. | 524/169 |
| 4,254,015 | 3/1981 | Thomas et al. | 524/169 |
| 4,535,104 | 8/1985 | Pyles | 524/91 |
| 4,600,632 | 7/1986 | Paul et al. | 524/91 |
| 4,727,101 | 2/1988 | Ogoe et al. | 524/83 |

*Primary Examiner*—Veronica P. Hoke
*Attorney, Agent, or Firm*—B. G. Colley

[57] ABSTRACT

Ultra violet light resistant polycarbonates are produced having processing or heat stability by adding compatible UV absorbing compounds and aromatic sulfonimides. The UV absorbing compounds are used in amounts from about 0.01 to about 5.0% by weight and the sulfonimides are used in an amount from about 0.0001 to about 10.0%. The preferred UV absorber is 2-(2'-hydroxy-5'-t-octylphenyl)-benzotriazole. The preferred sulfonimide is N-(p-tolylsulfonyl)-p-toluenesulfonimide.

10 Claims, No Drawings

ULTRA VIOLET LIGHT RESISTANT CARBONATE POLYMERS WITH IMPROVED PROCESSING STABILITY

BACKGROUND OF THE INVENTION

This invention relates to carbonate polymer compositions containing additives which act as an ultra violet light stabilizers and heat stabilizers.

Carbonate polymers derived from reactions of dihydroxyorganic compounds, particularly the dihydric phenols, and carbonic acid derivatives such as phosgene, have found extensive commercial application because of their excellent physical properties. These thermoplastic polymers are suitable for the manufacture of molded parts wherein impact strength, rigidity, toughness, heat resistance and excellent electrical properties are required.

It is known from U.S. Pat. No. 3,367,958 that benzotriazoles are useful to stabilize polycarbonate resins against the effects of UV light. However, it has been found that these additives also degrade the resins during processing.

In view of the deficiencies of the conventional UV stabilized carbonate polymer compositions, it would be highly desirable to provide a carbonate polymer composition having resistance to UV light and which exhibits good molecular weight stability and optical stability upon processing.

SUMMARY OF THE INVENTION

The present invention is a carbonate polymer composition containing (A) an effective amount of carbonate polymer compatible ultra violet light absorbing compound, and (B) a functionally effective amount of an aromatic sulfonimide whereby said sulfonimide and the amount used are selected to provide a measurable degree of molecular weight stability to the carbonate polymer composition upon thermal processing.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039: polycarbonates of bis(ar-hydroxyphenyl) alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121; 4,105,633; 4,156,069; 4,225,556; 4,260,731; 4,287,787; 4,330,662; 4,355,150; 4,360,656; 4,374,973; and 4,388,455. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The aromatic sulfonimides used in this invention are any compatible imide compound. Desirably, such a compound is one which is capable of introducing a buffering character to the carbonate polymer composition containing an amount of the aforementioned compound. Typically, the pKa of the imide compound ranges from about 1 to about 5. Exemplary of such sulfonimides are N-(p-tolylsulfonyl)-p-toluenesulfonimide; saccharin; N-(N'-benzylaminocarbonyl)sulfanilamide; N-(phenylcarbonyl)-sulfanilamide; N-(2-pyrimidinyl) sulfanilamide, N-(2-thiazolyl)-sulfanilamide, N-(2-quinoxalinyl)sulfanilamide, and other compounds disclosed in U.S. Pat. No. 4,254,015; which is hereby incorporated by reference.

The aromatic sulfonimides used herein are represented by the formula:

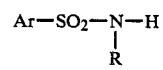

where Ar is an aromatic group such as phenyl, tolyl, and phenylene, R is an arylcarbonyl (e.g. benzoyl), aralkylaminocarbonyl (e.g. benzyl-aminocarbonyl); arylsulfonyl (e.g., tolylsulfonyl) or heterocylic sulfonyl such as 2-thiazolylsulfonyl, and R and Ar can be joined to form a benzosulfimide.

A functionally effective amount of the aromatic imide component provides a measurable degree of molecular weight stability and maintains the desirable optical properties of the carbonate polymer composition. The imide is suitably present in an amount of from about 0.0001 to about 10.0, desirably from about 0.001 to about 5.0, beneficially from about 0.01 to about 2.0 weight percent based on total weight of the carbonate polymer to which the imide is added. It is to be understood that amounts outside these ranges may be used depending upon the specific UV stabilizer used and the particular polycarbonate resin used.

Examples of UV stabilizers useful in this invention are hydroxy phenyl benzotriazoles such as 2-(2'-hydroxy-5'-methylphenyl) benzotriazole, 2-(2'-hydroxy-5'-t-octylphenyl) benzotriazole, and 2-(2'-hydroxy- 5'-butylphenyl) benzotriazole. Benzophenones are also useful herein. Examples of useful compounds are 2-hydroxy-4-methoxybenzophenone, 2-hydroxy-4-n-octyloxybenzophenone, 2-hydroxy-4-n-dodecyloxybenzophenone, 2-hydroxy-4-allyloxybenzophenone, 2,2'-dihydroxy-4,4'-dimethoxybenzophenone, and 2,2',4,4',-tetrahydroxybenzophenone. Examples of useful acrylic esters are ethyl-2-cyano-3,3-diphenylacrylate and 2-ethylhexyl-2-cyano-3,3-diphenylacrylate.

The UV stabilizers are present in an amount from about 0.01 to about 5.0 weight per cent based on the total weight of the polycarbonate. Amounts greater than this broad range can be used but excessive amounts result in the embrittlement of the carbonate polymer. Lower amounts can also be used but they are ineffective to protect the polymer. A preferred range is 0.1 to 3.0 percent and the most preferred range is 0.2 to 0.5 percent.

The carbonate polymer compositions of the present invention are suitably prepared by blending the various components of the composition through blending procedures conventionally employed for incorporating additives into carbonate polymer resins. For example, dry particulates of the carbonate polymer, the UV stabilizer and the aromatic imide can be dry blended and the resulting dry blend extruded and molded into the desired shape. It is understood that any method of blending which results in the aromatic imide being substantially uniformly dispersed in the carbonate polymer is suitable for use in forming the compositions of the present invention.

In addition to the aforementioned additives, other additives can be included in the carbonate polymer composition of the present invention such as fillers (i.e., a tetrafluoroethylene polymer or glass fibers), pigments, dyes, antioxidants, mold release agents and other additives commonly employed in carbonate polymer compositions.

In one preferred embodiment of the present invention, the carbonate polymer employed is a homopolymer of 2,2-bis(4-hydroxyphenyl)propane (Bisphenol A) and has dispersed therein 2-(2'-hydroxy-5'-t-octylphenyl)-benzotriazole and N-(p-tolylsulfonyl)-p-toluenesulfonimide.

The following examples are given to further illustrate the invention and should not be construed as limiting its scope. In the following examples, all parts and percentages are by weight unless otherwise indicated.

CONTROL I

Heat stabilized homopolycarbonate (33,000 weight average molecular weight) containing 0.05% by weight of tris(2,4-di-t-butylphenyl) phosphite was dry blended with 0.3% by weight of 2-(2'-hydroxy-5'-t-octylphenyl)-benzotriazole. This is known as Cyasorb 5411-a trademark of American Cyanamid. The blended material was extruded at 275° C. into pellets which were then dried for 3 hours at 125° C. A 40 gram portion of the dried pellets were subjected to melt shearing for processing stability measurements at 282° C. for 30 minutes using a torque rheometer (see Table II). The remainder of the dried pellets were molded at 300° C. into 2 inch diameter disks for optical measurements before and after UV aging using the fluorescence lamp exposure apparatus (F.L.E.A.) (see Table III).

EXAMPLE I

The procedure for Control I was repeated using 0.3% by weight Cyasorb 5411 and 0.03% N-(p-tolylsulfonyl)-p-toluenesulfonimide (HPTSM).

EXAMPLE II

The procedure for Control I was repeated using 0.3% by weight of Cyasorb 5411 and 0.05% HPTSM.

CONTROL II

The procedure for Control I was repeated using only the heat stabilized polycarbonate.

Molecular weight by gel permeation chromatography (GPC) was measured before and after the polymer was subjected to high temperature melt shearing by a torque rheometer to analyze and determine the processing as well as the thermal stability of the polymer. By this method of analysis, it can be deduced that the greater the change in molecular weight, the less stable the polymer is to a high temperature melt processing. See Table I.

TABLE I

| Sample | Molecular Weight (Mw) Initial | Molecular Weight (Mw) Final | Molecular Weight (Mw) ΔMw |
| --- | --- | --- | --- |
| Heat Stabilized Polymer control II | 33,800 | 31,800 | 2,000 |
| control I | 33,000 | 26,450 | 6,550 |
| Example I | 33,500 | 31,800 | 1,700 |
| Example II | 33,650 | 32,450 | 1,200 |

TABLE II

| Sample | Torque Meter Grams Initial | Torque Meter Grams Final | Torque Meter Grams ΔTorque |
| --- | --- | --- | --- |
| Heat Stabilized Polymer control II | 650 | 550 | 100 |
| control I | 580 | 280 | 300 |
| Example I | 660 | 575 | 85 |
| Example II | 670 | 600 | 70 |

Table I demonstrates the detrimental effect of Cyasorb 5411 on polycarbonate processing stability. It shows that 0.3% Cyasorb 5411 exhibits the most increase in molecular weight change. However, incorporation of 0.03% to 0.5% HPTSM improves the polymer processing stability by showing significant decrease in molecular weight change. Furthermore, Table II shows actual decrease in torque change of the formulation containing HPTSM and Cyasorb 5411 combination over the formulation containing Cyasorb 5411 only. This is clearly another indication that HPTSM assists in improving the processing stability of UV stabilized polycarbonate.

TABLE III

| 300 Hours Fluorescence Lamp Exposure Apparatus Test for Ultraviolet Aging | | | | |
| --- | --- | --- | --- | --- |
| Sample | YI | % T | % H | MFR (gms/10 min.) |
| control II | 10.00 | 1.05 | 1.33 | 1.57 |
| control I | 5.43 | 0.70 | 0.94 | 0.80 |
| Example I | 5.00 | 0.40 | 0.30 | 0.25 |
| Example II | 4.90 | 0.32 | 0.20 | 0.24 |

Where YI is the yellowness index, %T is the percent transmittance, and %H is the percent haze in accordance with ASTM-D-1925. MFR is the melt flow rate.

Table III shows that after 300 hours of UV aging in the fluorescence lamp exposure apparatus (F.L.E.A.), formulations containing both Cyasorb 5411 and HPTSM (Examples I and II) exhibited improved optical properties over the formulations without HPTSM. Moreover, the HPTSM and Cyasorb 5411 combination offered the least change in melt flow rate (MFR) after 300 hours UV aging in the F.L.E.A. These results further demonstrate the synergism of HPTSM and Cyasorb 5411 to impart long term UV stability to polycarbonate.

I claim:

1. A composition comprising a carbonate polymer containing (A) an effective amount of a carbonate polymer compatible ultra violet light absorbing compound which is 2-(2'-hydroxy-5=-t-octylphenyl)-benzotriazole, and (B) a functionally effective amount of an aromatic sulfonimide which is represented by the formula:

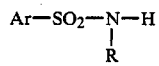

wherein Ar is an aromatic group, R is aryl carbonyl, aralkylaminocarbonyl, aromatic sulfonyl, or heterocylic sulfonyl, and R and Ar can be joined to form a benzosulfimide whereby said sulfonimide and the amount used are selected to provide a measureable degree of molecular weight stability to the carbonate polymer composition upon thermal processing.

2. A composition comprising a carbonate polymer containing (A) 0.01 to 10.0% by weight of one or more carbonate polymer compatible ultra violet light absorbing compounds selected from the group consisting of benzophenones, benzotriazoles, and acrylic esters, and (B) a functionally effective amount of an aromatic sulfonimide which is represented by the formula:

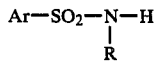

wherein Ar is an aromatic group, R is aryl carbonyl, aralkylaminocarbonyl, aromatic sulfonyl, or heterocylic sulfonyl, and R and Ar can be joined to form a benzosulfimide whereby said sulfonimide and the amount used are selected to provide a measurable degree of molecular weight stability to the carbonate polymer composition upon thermal processing.

3. The composition of claim 2, wherein said carbonate polymer is a homopolycarbonate of 2,2-bis(4-hydroxyphenyl)propane.

4. The composition of claim 2, wherein said aromatic sulfonimide exhibits a pKa of from about 1 to about 5.

5. The composition of claim 2 wherein the sulfonimide is N-(p-tolylsulfonyl)-p-toluenesulfonimide.

6. The composition of claim 2, wherein the U V stabilizer is present in an amount of from about 0.1 to about 1.0 weight percent and the imide is present in an amount of from about 0.001 to about 2.0 weight percent, based on the total weight of carbonate polymer.

7. The composition of claim 2 wherein the ultra violet light absorbing compound is 2-(2'-hydroxy-5'-t-octylphenyl)-benzotriazole.

8. A composition comprising a carbonate polymer containing (A) 0.01 to 10.0% by weight of a carbonate polymer compatible ultra violet light absorbing benzotriazole and (B) a functionally effective amount of an aromatic sulfonimide which is represented by the formula:

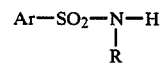

wherein Ar is an aromatic group, R is aryl carbonyl, aralkylaminocarbonyl, aromatic sulfonyl, or heterocylic sulfonyl, and R and Ar can be joined to form a benzosulfimide whereby said sulfonimide and the amount used are selected to provide a measurable degree of molecular weight stability to the carbonate polymer composition upon thermal processing.

9. The composition of claim 8 wherein the benzotrialzole is 2-(2'-hydroxy-5-'-t-octylphenyl)benzotriazole.

10. The composition of claim 8 wherein the sulfonimide is N-(p-tolylsulfonyl)-p-toulenesulfonimide.

* * * * *